United States Patent
Brayton

(10) Patent No.: US 8,291,265 B2
(45) Date of Patent: Oct. 16, 2012

(54) INTEGRATED ACCEPTANCE TESTING

(75) Inventor: D. Dwight Brayton, Richland, WA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 1075 days.

(21) Appl. No.: 11/568,554

(22) PCT Filed: May 4, 2005

(86) PCT No.: PCT/US2005/015597
§ 371 (c)(1),
(2), (4) Date: Oct. 6, 2008

(87) PCT Pub. No.: WO2005/109011
PCT Pub. Date: Nov. 17, 2005

(65) Prior Publication Data
US 2009/0216605 A1 Aug. 27, 2009

Related U.S. Application Data

(60) Provisional application No. 60/568,652, filed on May 5, 2004.

(51) Int. Cl.
*G06F 11/00* (2006.01)
(52) U.S. Cl. ......................................................... 714/37
(58) Field of Classification Search ....................... 714/37
See application file for complete search history.

(56) References Cited

U.S. PATENT DOCUMENTS

| | | | |
|---|---|---|---|
| 5,263,158 A | 11/1993 | Janis | |
| 5,495,578 A * | 2/1996 | Rohrbaugh et al. | ............. 714/51 |
| 5,696,898 A | 12/1997 | Baker et al. | |
| 5,826,258 A | 10/1998 | Gupta et al. | |
| 5,937,084 A | 8/1999 | Crabtree et al. | |
| 6,236,996 B1 | 5/2001 | Bapat et al. | |
| 6,370,139 B2 | 4/2002 | Redmond | |
| 6,658,400 B2 | 12/2003 | Perell et al. | |
| 6,904,380 B1 * | 6/2005 | Brayton et al. | ................ 702/108 |
| 7,133,794 B1 * | 11/2006 | Brayton et al. | ................ 702/108 |
| 7,228,461 B2 * | 6/2007 | Krietemeyer et al. | ........... 714/45 |
| 7,454,004 B2 * | 11/2008 | Shvadron | ................. 379/210.01 |
| 2003/0126517 A1 * | 7/2003 | Givoni et al. | .................... 714/46 |
| 2004/0025030 A1 * | 2/2004 | Corbett-Clark et al. | ....... 713/186 |
| 2004/0153788 A1 * | 8/2004 | Krietemeyer et al. | ........... 714/25 |
| 2004/0258232 A1 * | 12/2004 | Shvadron | ................. 379/210.01 |
| 2005/0055306 A1 | 3/2005 | Miller et al. | |
| 2005/0066015 A1 * | 3/2005 | Dandekar et al. | ............. 709/220 |
| 2005/0221811 A1 * | 10/2005 | Straub et al. | ................... 455/420 |
| 2009/0019313 A1 * | 1/2009 | Pokala et al. | .................... 714/37 |

* cited by examiner

*Primary Examiner* — Kamini Patel
(74) *Attorney, Agent, or Firm* — Fish & Associates, PC

(57) ABSTRACT

Contemplated validation systems provide access to a master validator, one or more remote validators, and an authorized party such that validation using a validation script can be performed in a flexible manner that allows modifications to the script in real time. Typically, modifications are requested by a remote validator in the field where the remote validator can not answer a validation request generated by the validation script in a proper or predetermined manner. A master validator will receive the request and modify the validation script accordingly to allow the validation to proceed. Most typically, modification of the script is authorized by an authorized party.

20 Claims, No Drawings

INTEGRATED ACCEPTANCE TESTING

This application claims priority to our copending U.S. provisional patent application with the Ser. No. 60/568,652, which was filed May 4, 2004, and which is incorporated by reference herein.

FIELD OF THE INVENTION

Software, configurations and methods for validation, quality control/quality assurance, and on-site multi-user testing.

BACKGROUND OF THE INVENTION

Many validation, quality control/quality assurance, and other multi-user testing processes involve more than one party that depends at least in part on a test result of a work product provided by yet another party. For example, electrical devices are frequently delivered only upon successful completion of test on the electrical infrastructure at a building site. In another example, and especially where a previous test was not successfully completed, changes to an already existing structure may need to be implemented by an engineering team, and such changes will further have to be relayed to other parties involved in the construction.

Typically, validations or tests are performed in a sequential manner in which a user tests a structure, process, or other component, and then relays the test result to a central record keeping organization (e.g., engineering firm, clinical trials coordinator; US2004/0025030). Where the test sites are in a remote location relative to the organization, such validations are often performed by a user at the test site using a portable data entry device (e.g., laptop computer, PDA, or notebook), and the results are then entered into a central computer once the user returns to the organization. Such process is not only time consuming, but may also be error-prone where complex and/or numerous structures or parameters are entered. Even if data entry is automated, such processes are generally limited to those in which the validation request remains unchanged over a plurality of tests. Furthermore, where a second party requires a specific test result for further progress (e.g., determination of a modified distance between two points in a structure, or availability of infrastructure), that test result may not be available to the user for several hours, and more typically even days.

In other acceptance test procedures, tests are performed and results recorded in writing, for example, with sequenced steps being initialed as performed. At times, witness signatures are required as well, for example, where a critical system or subsystem is being tested. If errors arise, then separate exception reports are filled out documenting the cause of the error and/or exception so as to document the actions required to remedy and then retest. To alleviate at least some of the burden in such processes, computer checklists are employed that specify the test sequence and validation steps. However, such checklists are usually in form of a word processing document that is filled out on a laptop or pocket PC.

Thus, while there numerous manners of testing and validation are known in the art, all or almost all of them suffer from one or more disadvantages. Therefore, there is still a need to provide improved systems and methods for integrated acceptance testing.

SUMMARY OF THE INVENTION

The present invention is directed to interactive and real-time validation systems and methods in which field personnel (one or more remote validators) can interact with a project manager (master validator) to receive validation requests and/or send data pertaining to one or more previously received validation requests. Contemplated systems also allow immediate modification of a validation script in response to feedback from the field personnel, and such modification is preferably implemented by the project manager upon authorization by the project owner and/or component supplier (authorized party) who has real-time access to the validation system.

In one aspect of the inventive subject matter, a method of validating includes a step in which a validation script having a plurality of validation requests is executed on a computer system, wherein execution is controlled by a master validator. In another step, at least one of a plurality of remote validators is allowed to access the computer system and to receive at least one of the validation requests from the computer system. In a still further step, the remote validator is allowed to provide feedback to the computer system in response to the validation request to thereby prompt the master validator to modify the validation script, and in a still further step, the master validator is allowed to receive authorization from an authorized party to modify the validation script. At least part of the modified validation script is then provided to the remote validator that requested modification and to one other remote validator and/or the authorized party.

In another aspect of the inventive subject matter, a method of validating includes a step of executing a validation script having a plurality of validation requests on a computer system. In another step, real-time access is provided to the computer system for a master validator, a plurality of remote validators, and an authorized party, and in yet another step, modification of the validation script in response to a feedback to a validation request is allowed upon authorization from the authorized party. In a still further step, at least part of the modified validation script is provided to the master validator, at least one of the remote validators, and/or the authorized party.

Preferably, the authorized party and/or other remote validators are allowed to monitor the validation script in real-time, and a notification may be sent to the authorized party and/or other remote validators in response to a modification to the validation script. Where desirable, at least one of the authorized party and the master validator are in a location remote relative to the computer system, and/or at least one of the remote validators is a device (e.g., SIM-Cart). Furthermore, and especially in relatively small validation projects, it is contemplated that the master validator and the authorized party are the same person.

Depending on the particular validation script, no authorization, preauthorization, or real-time authorization may be required to allow the master validator to modify the validation script. Typically, modification of the validation script may include an alteration, an addition, and/or a deletion of a validation request. Further contemplated modifications include taking at least one validation request out of a predetermined sequence of validation requests, or a repetition of a validation request.

Various objects, features, aspects and advantages of the present invention will become more apparent from the following detailed description of preferred embodiments of the invention.

DETAILED DESCRIPTION

The inventor discovered that validation, quality control, quality assurance, and/or on-site multi-user testing can be performed using configurations and methods in which a central database is controlled by an operator (e.g., a master validator). Preferably, validation requests are generated using the database and/or transmitted to field personnel (e.g., remote validators) that will provide feedback to the database in response to the validation request. Parties which have been granted selective or complete access to the database can then in real-time monitor progress of the validation, modify the validation script that includes the validation requests, and/or monitor/modify selected test results. It should be recognized that validation requests may be modified by one or more party other than the master validator, and/or that a test result provided by the remote validator even automatically modifies a validation request in the validation script.

In one preferred aspect, it is contemplated that multiple users assemble individually or collectively test procedures (validation scripts) into a database for review, modification, reporting, performance, and retesting orders. For example, in an exemplary review process, multiple personnel in different locations can review the test procedure and "sign-off" with electronic signatures that are well known in the art (e.g., for "chain-of-custody" procedures of environmental samples). Such review processes can form the basis for template libraries reusable by other companies for similar tasks (e.g., Construction Acceptance Test (CAT), Factory Acceptance Test (FAT), etc.).

Therefore, it should be recognized that any user with a PC and link to a network through which the database is accessible can partake actively or passively by image and/or text data viewing, queing of data, reviewing of test reports, etc. Modifications in a validation script that would otherwise require stopping of a validation sequence to allow for exchange of revised documents, reviews, and traditional signatures, can now be performed on-line and in real-time. Moreover, changes can be immediately approved via electronic signature to let testing resume immediately while maintaining configuration control. Similarly, for reporting, the database may provide querying and queuing capabilities for export to word processing templates as required. Still further, retesting is immediate and direct, as the database keeps track of those exceptions that need retest and indirect and direct relationships to the other test areas that may or may not be affected.

In contrast, in currently known systems, testing and reviewing is often performed by scanning static signature sheets with no inherent query capability or structure to the text, even with complex Optical Character Recognition algorithms. In such known systems, retest items, due to their manual generation tend to "fall through the cracks" leading to incomplete and perhaps costly errors later on. Also, effects to other parts of testing are not as easily analyzed as they do not exist in a data structure with relationships that are automated for evaluation.

In a further preferred aspect of the inventive subject matter, the database will export the validation requests to a wireless device (e.g., a wireless PDA, PC, or cell phone), and test results are imported to the database in likewise fashion. For example, export and import may utilize wireless networks, the Internet, or telephone network using devices and methods well known in the art.

Validation requests are preferably assembled into one or more validation scripts, and most preferably into a relational database format (e.g., Structured Query Language (SQL). For example, a validation request would require assessment of an acceptance criteria that are then answered by a human tester such as "Is the support within 10 degrees of vertical?", or "Is the alarm flashing red on the HMI PC screen?". Alternatively, assessment can also be automatically performed by comparison of sensor data to an expected result by an automated test machine (e.g., SIMCart; see allowed application Ser. No. 09/936,080). Furthermore, it should be recognized that multiple validation scripts can be linked to provide a comprehensive test set or test procedure. Among other advantages, check-out of multiple equipment packages and/or processes can be coordinated remotely. In fact, even training and simulations can now be performed for Factory Acceptance Testing on sub-systems prior to delivery. Where a test result indicates that a validation was not successfully completed, alerts may be automatically generated that provide notification and/or reschedule further events.

It should be recognized that validation requests and/or validation scripts can be sent in all known manners, including wireless technologies, to multiple personnel field devices (e.g., PC, Laptop, PDA, Pocket PC, cell phone, etc.) that are field-based and/or office-based within reach of the wireless network. Among other suitable configurations, a personal computer of a project manager could be used to distribute (and/or modify) a validation script or one or more validation requests to various personnel in a desired and coordinated chronological, and/or event based sequencing. For example, using a phone feature of a field-based device, the director would communicate to the personal that the testing is ready to commence. At that point, the field personnel with the devices would respond by voice or other manner that they were ready for testing to commence. Validation requests and/or validation scripts, either human or process control/monitoring I/O signals would be sent to the field regardless of location (typically remote, i.e., at a distance of at least 1 mile, and more typically at least 10 miles). The remote validator would then receive text and/or voice commands and could provide feedback via input into his field device. For example, suitable feedback may be a voice reply, electronically transmitted data (e.g., test data or image), etc., which may be further associated with a written, audible, or displayed comment. Thus, and among other options, suitable feedback may include suggestions for troubleshooting, recommendations for modification of the validation request or script, and/or general comments (e.g., requested test step for device component can not be implemented because the component is not present), and/or environmental data (temperature, humidity, etc.). Of course, it should be appreciated that at least one of the remote validators can also be a device that provides that feedback in response to a prompt transmitted from the computer system of the master validator. Most typically, all feedback, human generated or otherwise (e.g., SIMCart), will be integrated into the database for correlation and reporting. Test reports may then be generated by query and appropriate formatting. Alternatively, at least some of the feedback may also be directly provided to at least one other remote validator (e.g., to stop further testing) and/or the authorized party.

In the case of test errors, it is generally preferred that the modification to the script is implemented by the proper level of authorized and secured personnel. For example, a project manager may be pre-authorized for certain modifications while other modifications can only be implemented by the project manager after approval by an authorized party (e.g., client and/or device or component manufacturer). Where the validation project is relatively small, the master validator and the authorized party may be the same person. Depending on the type of requested modification, it should be recognized that the authorized party may be alerted in real time and be able to view the feedback from the remote validator (e.g., by logging in to the computer system) that executes the validation script. Thus, it should be appreciated that on-line review and verification by clients and/or technical personnel via electronic signature and release assures a timely review that allows testing to resume within minutes rather than hours or days. Test direction and client interaction may happen at remote locations as well. Consequently, partial or even complete test reports can be reviewed and verified on-line.

Therefore, it should be appreciated that a method of validating comprises a step of executing a validation script having a plurality of validation requests on a computer system, wherein execution is controlled by a master validator. A further step includes allowing at least one of a plurality of remote validators to access the computer system and to receive at least one of the validation requests from the computer system, and a still further step comprises allowing the at least one remote validator to provide feedback to the computer system in response to the validation request to thereby prompt the master validator to modify the validation script. Once modified, the master validator is allowed to receive authorization from an authorized party to modify the validation script, and providing at least part of the modified validation script to the at least one remote validator and to at least one other of the plurality of remote validators.

With respect to the validation script, it is typically preferred that the authorized party and/or one or more of the remote validators can monitor the validation script with and without modifications in real-time. Such immediate access has numerous advantages, as it reduces travel and downtime of remote validators and/or authorized parties, as well as it increases awareness of the progress or discontinuation of the validation progress. In especially preferred aspects, notification can be provided to the master validator, other remote validators, and/or the authorized party where a remote validator and/or the master validator provides feedback and/or requests modification of the validation script. Notification is especially useful where at least one of the parties is in a remote location (e.g., at least 0.1 mile apart, more typically at least 1 mile apart) relative to another one of the parties. On the other hand, notification may be entirely omitted where the modification is preauthorized and automatically generated (e.g., where a tested component is defect and modification of the script comprises generation of a retesting validation request).

There are numerous manners of modification to the validation script contemplated, and all possible modifications are deemed suitable, including alteration, addition, and/or deletion of a validation request. Further suitable modifications include rearrangement of validation requests (e.g., taking a validation request out of a predetermined sequence of validation requests), and change of authorization for access to the computer.

Similarly, it is contemplated that a method of validating includes a step of executing a validation script having a plurality of validation requests on a computer system. In another step, real-time access to the computer system is provided for a master validator, a plurality of remote validators, and an authorized party, and in a still further step, modification of the validation script is permitted in response to a feedback to a validation request upon authorization from the authorized party. Once modified, at least part of the validation script is provided to at least one of the master validator, at least one of the plurality of remote validators, and the authorized party. With respect to the individual components and steps in such methods, the same considerations as provided above apply.

Thus, specific embodiments and applications of integrated validation systems and methods have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, where a definition or use of a term in a reference, which is incorporated by reference herein is inconsistent or contrary to the definition of that term provided herein, the definition of that term provided herein applies and the definition of that term in the reference does not apply.

What is claimed is:

1. A method of validating comprising:
    executing a validation script having a plurality of validation requests on a computer system, wherein execution is controlled by a master validator;
    allowing at least one of a plurality of remote validators to access the computer system and to receive at least one of the validation requests from the computer system;
    allowing the at least one remote validator to provide feedback to the computer system in response to the validation request to thereby prompt the master validator to modify the validation script; and
    allowing the master validator to receive authorization from an authorized party to modify the validation script, and providing at least part of the modified validation script to the at least one remote validator and to at least one other of the plurality of remote validators.

2. The method of claim 1 further comprising allowing the authorized party to monitor the validation script in real-time.

3. The method of claim 1 further comprising allowing the at least one other of the plurality of remote validators to monitor the validation script in real-time.

4. The method of claim 1 further comprising a step of providing a notification to the authorized party in response to the feedback to the computer system.

5. The method of claim 1 wherein at least one of the plurality of remote validators is a test device.

6. The method of claim 1 wherein at least one of the authorized party and the master validator is in a location remote relative to the computer system.

7. The method of claim 1 wherein the master validator and the authorized party are the same person.

8. The method of claim 1 wherein the authorization from the authorized party to modify the validation script is a pre-authorization, and wherein the validation script is automatically modified in response to the feedback.

9. The method of claim 1 wherein modification of the validation script includes at least one of an alteration, an addition, or a deletion of a validation request.

10. The method of claim 1 wherein modification of the validation script includes an instruction to take at least one validation request out of a predetermined sequence of validation requests.

11. A method of validating comprising:
    executing a validation script having a plurality of validation requests on a computer system;
    providing real-time access to the computer system for a master validator, a plurality of remote validators, and an authorized party;
    allowing modification of the validation script in response to a feedback to a validation request upon authorization from the authorized party; and providing at least part of the modified validation script to at least one of the master validator, at least one of the plurality of remote validators, and the authorized party.

12. The method of claim 11 wherein at least one of the master validator and the authorized party are in a remote location relative to the computer system.

13. The method of claim 11 wherein modification of the validation script is automatically performed.

14. The method of claim 11 wherein modification of the validation script requires at least one of an authorization and a preauthorization by the authorized party.

15. The method of claim 11 wherein the authorized party and the master validator are the same person.

16. The method of claim 11 wherein at least one of the plurality of remote validators is a test device.

17. The method of claim 11 wherein modification of the validation script includes at least one of an alteration, an addition, or a deletion of a validation request.

18. The method of claim 11 wherein modification of the validation script includes an instruction to take at least one validation request out of a predetermined sequence of validation requests.

19. The method of claim 11 wherein the master validator modifies the modification script.

20. The method of claim 11 wherein the feedback is provided to the computer system on-line.

* * * * *